Figure 3:
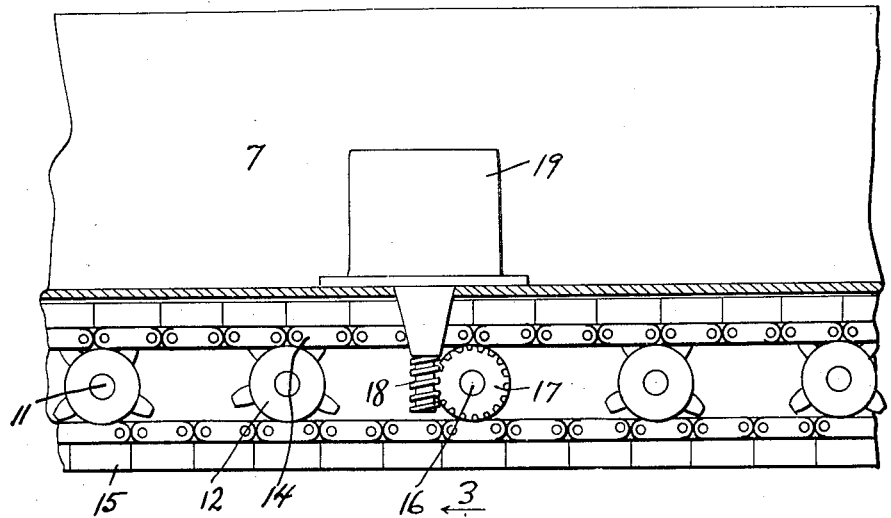

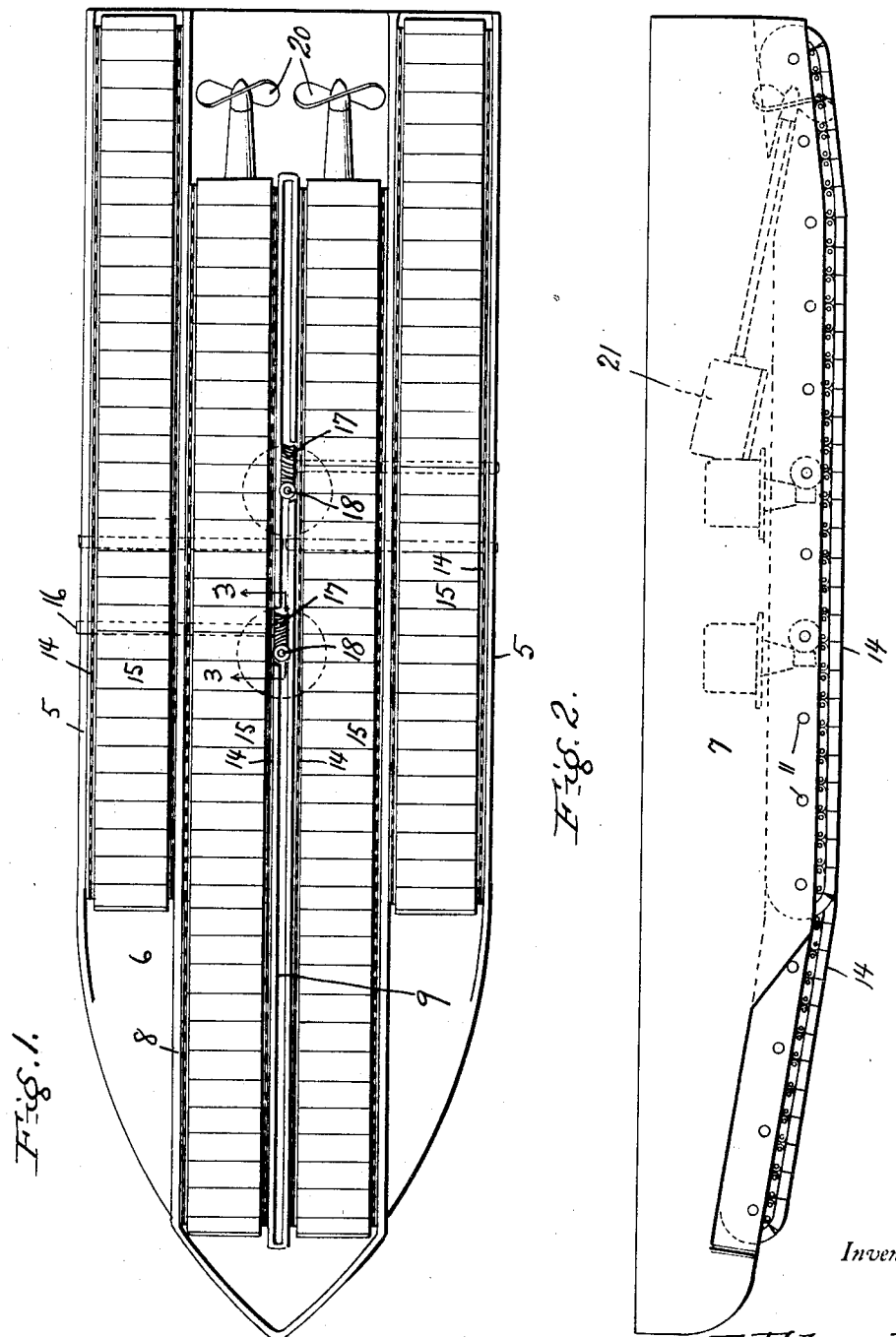

March 4, 1930. J. T. EDMONDS 1,749,276
SHALLOW WATER BOAT
Filed Dec. 5, 1928 4 Sheets-Sheet 2

Inventor
John T. Edmonds
By Clarence A. O'Brien
Attorney

March 4, 1930. J. T. EDMONDS 1,749,276
SHALLOW WATER BOAT
Filed Dec. 5, 1928    4 Sheets-Sheet 3

Inventor
John T. Edmonds
By Clarence A. O'Brien
Attorney

March 4, 1930. J. T. EDMONDS 1,749,276
SHALLOW WATER BOAT
Filed Dec. 5, 1928  4 Sheets-Sheet 4
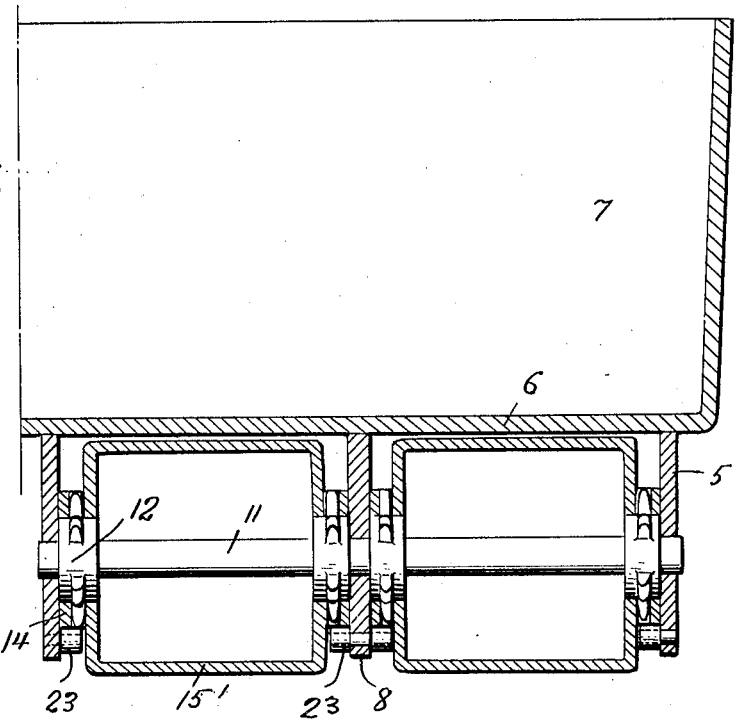
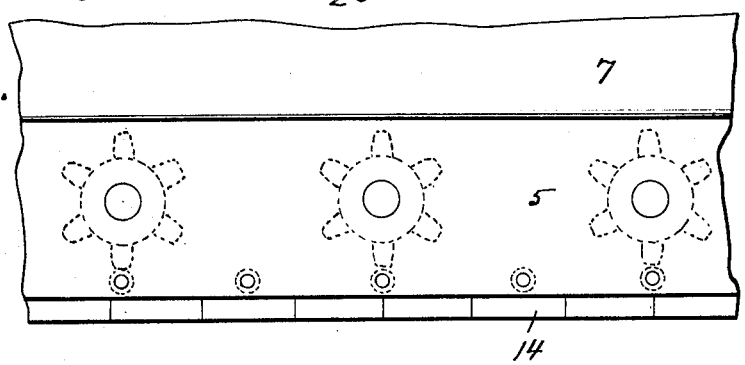
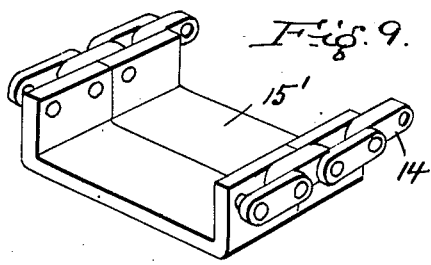
Inventor
John T. Edmonds
By Clarence A O'Brien
Attorney Patented Mar. 4, 1930

1,749,276

UNITED STATES PATENT OFFICE

JOHN T. EDMONDS, OF FORT STOCKTON, TEXAS

SHALLOW-WATER BOAT

Application filed December 5, 1928. Serial No. 323,856.

The present invention relates to shallow water boats and the prime object thereof is to obtain a boat capable alike of locomotion on land and water, being designed more especially for the navigation in shallow rivers or such as are obstructed by sand bars.

Another very important object of the invention resides in the provision of a boat in combination with a caterpillar structure along the bottom thereof capable of supporting the boat and moving the same along the ground in a shallow stream and including means for preventing the sagging of the lower runs thereof, so as to eliminate impedance as far as possible when the boat is travelling along while completely floating.

A still further very important object of the invention resides in the provision of a shallow water boat of this nature which is simple in its construction, strong and durable, comparatively inexpensive to manufacture, thoroughly efficient and reliable in use, dependable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
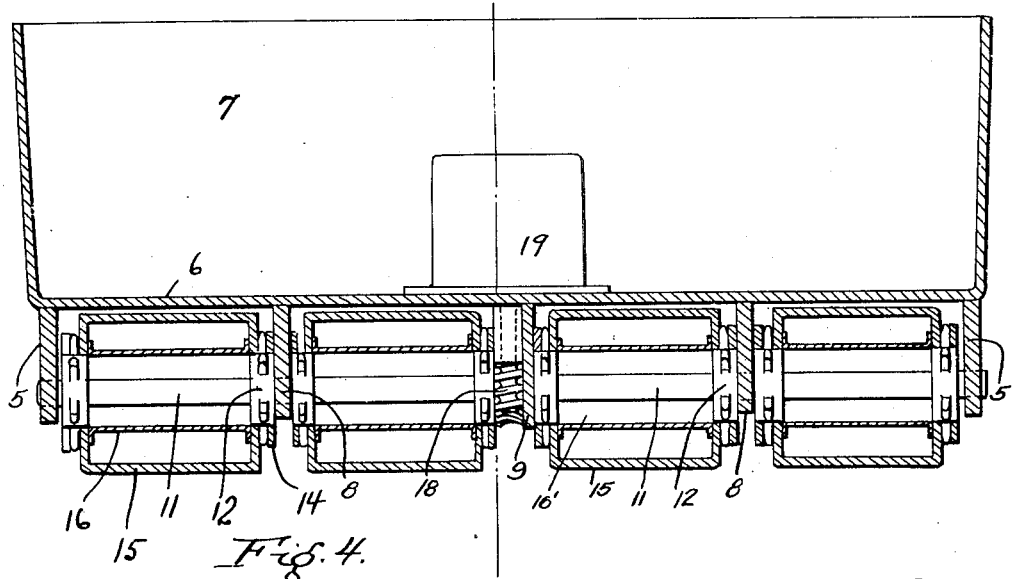
Figure 5:
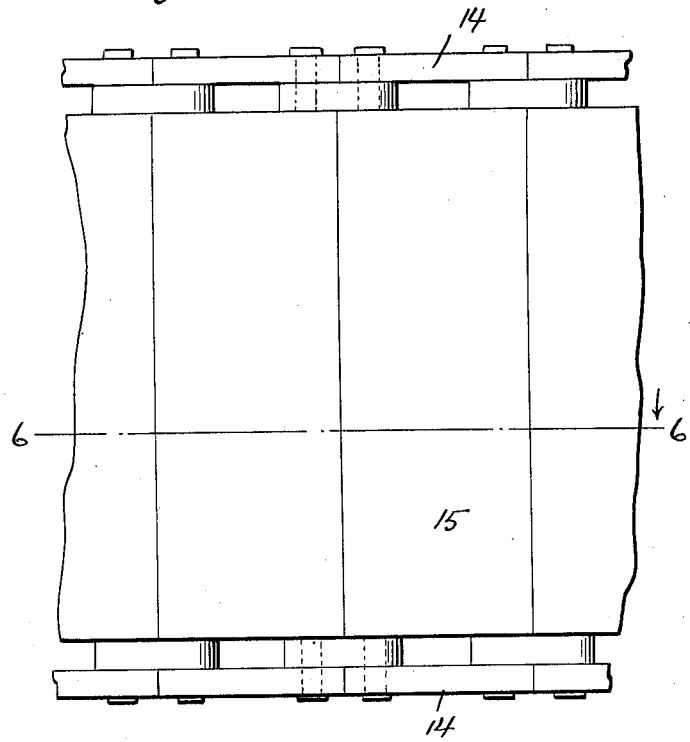
Figure 6:
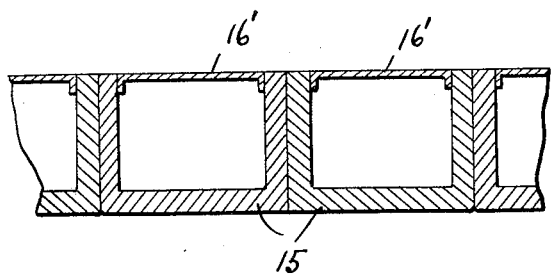

In the drawings:

Figure 1 is a bottom plan view of a boat embodying the features of my invention, Figure 2 is a side elevation thereof, Figure 3 is an enlarged detail section taken substantially on the line 3—3 of Figure 4, Figure 4 is a transverse vertical section through the boat, Figure 5 is an enlarged detail bottom plan view of one of the caterpillars, Figure 6 is a sectional view therethrough taken substantially on the line 6—6 of Figure 5, Figure 7 is a fragmentary transverse sectional view through a boat with another embodiment of the caterpillar structure, Figure 8 is a fragmentary side elevation thereof, and Figure 9 is a fragmentary detail perspective view showing a portion of one of the caterpillars.

Referring to the drawing in detail it will be seen that in the examples of practical embodiment of the invention disclosed in the drawing I utilize a pair of side plates 5 depending from the bottom 6 of the boat 7 which may be of any preferred design or construction and further provides a pair of plates 8 depending from the bottom 6 and a pair of center plates 9 depending from the bottom 6, the plates 8 being disposed between the plates 5 and 9.

The plates 8 and 9 extend from adjacent the bow of the boat rearwardly it being noted that the plates 8 terminate at the rear end or stern of the boat while the plates 9 terminate short of the stern of the boat. The plates 5 start rearwardly of the plates 8 and 9 and terminate at the stern. A plurality of shafts 11 are journaled between the plates 5 and 8 and 8 and 9 and have sprockets 12 thereon about which are trained endless chains 14 and between these chains 14 and between the plates 5 and 8 and 8 and 9 are mounted tread members 15 which are of hollow construction being closed by plates 16' so as to be in the form of floats and prevent the sagging of the lower run of the caterpillar thus formed. Shafts 16 have also sprockets 12 thereon and one shaft 16 is utilized to drive one pair of caterpillars to one side of the longitudinal center of the boat while the other shaft 16 is utilized to drive the other pair of caterpillars to the other side of the center of the boat.

Worm gears 17 are fixed to the inner end of the shaft 16 and mesh with worms 18 operatively connected to and driven by suitable prime movers 19 in the form of motors, turbines or any other suitable source of power located interiorly of the boat.

Propellers 20 are provided at the stern of the boat to the rear of the center caterpillars and between the rear ends of the side caterpillars and are operatively connected with a suitable prime mover 21 interiorly of the boat for driving the boat when in relatively deep water or fully afloat.

Referring particularly to the embodiment of the invention shown in Figures 7, 8 and 9 it will be seen that the tread members 15' are open and in order to prevent the sagging of the chains in this instance rollers 23 are provided on the plates under the lower runs of the chain.

Otherwise this latter embodiment is identical with the first described and a further detail explanation is obviously unnecessary.

From the above detailed description it will be seen that I have devised a shallow water boat which presents a minimum of impedance in its progess through the water when fully afloat and which may be maneuvered to advantage in shallow water and when resting on the bottom.

The structure is compartively simple yet may be made strong and durable with proper economy. It is thought that the construction, operation, utility and advantages of the invention will now be quite apparent to those skilled in this art without a more detailed description thereof.

The present embodiment of the invention has been described in detail merely for the purposes of exemplification since in actual practice it attains the features of advantage enumerated as desirable in the statement of the invention and the above description.

It will be apparent that changes in the details of construction, and in the combination and arrangmentof parts may be resorted to without departing from the spirit or scope of the invention as hereinafter claimed or sacrificing any of its advantages.

Having thus described my invention, what I claim as new is:

1. In a boat of the class described, a pair of side plates arranged on the bottom, a pair of center plates arranged on the bottom, and a pair of intermediate plates between the side and center plates, oppositely disposed shafts journaled between the center, intermediate, and side plates on each side of the center plates, sprockets on the shafts, chains trained about the sprockets, plates supported between the chains to form caterpillars, one shaft being common to a pair of caterpillars at each side of the center of the boat, and independent driving means for the last mentioned shaft, the two outermost caterpillars extending farther rearwardly than the inner one and the inner one extending farther forwardly than the outer one.

2. In a boat of the class described, a pair of side plates arranged on the bottom, a pair of center plates arranged on the bottom, and a pair of intermediate plates between the side and center plates, oppositely disposed shafts journaled between the center, intermediate. and side plates on each side of the center plates, sprockets on the shafts, chains trained about the sprockets, plates supported between the chains to form caterpillars, one shaft being common to a pair of caterpillars at each side of the center of the boat, and independent driving means for the last mentioned shaft, the two outermost caterpillars extending farther rearwardly than the inner one and the inner one extending farther forwardly than the outer one, propellers located to the rear of the inner one and between the outer ones, means for driving said propellers.

In testimony whereof I affix my signature.

JOHN T. EDMONDS.